United States Patent [19]
Conrad

[11] 3,878,810
[45] Apr. 22, 1975

[54] VEHICLE MOUNTED SAFETY WARNING DEVICE AND BRACKET THEREFOR

[76] Inventor: Gerald L. Conrad, 623 Crawford Ave., Ames, Iowa 50010

[22] Filed: Dec. 19, 1973

[21] Appl. No.: 426,237

[52] U.S. Cl. ............................. 116/28 R; 116/173
[51] Int. Cl. ............................................. B60q 1/26
[58] Field of Search.......... 116/28 R, 114, 173, 174, 116/175, 63 P; 248/38, 39, 40, 41, 42, 43, 403; 343/713, 715; 403/229

[56] References Cited
UNITED STATES PATENTS

| | | | |
|---|---|---|---|
| 1,828,892 | 10/1931 | Felton................................ | 116/173 |
| 1,861,532 | 6/1932 | Hough ............................ | 403/229 X |
| 2,193,747 | 3/1940 | Thompson ..................... | 116/173 X |
| 2,494,476 | 1/1950 | Goetter................................ | 248/40 |
| 3,044,435 | 7/1962 | Reardon ............................ | 116/114 |
| 3,064,617 | 11/1962 | Meagher ............................ | 116/28 R |
| 3,169,739 | 2/1965 | Yacobian............................. | 248/40 |
| 3,722,841 | 3/1973 | Ciolfi ................................... | 248/43 |

*Primary Examiner*—Richard C. Queisser
*Assistant Examiner*—Denis E. Corr
*Attorney, Agent, or Firm*—Zarley, McKee, Thomte & Voorhees

[57] ABSTRACT

A safety flag warning device and a support bracket therefor is disclosed. The support bracket is a spiraled spring member having a support receiving end and a fastening means end. The inside diameter of the spiral is of gradually decreasing diameter from the support receiving end to the fastening means end. The fastening means is preferably designed to provide a lock washer effect.

5 Claims, 4 Drawing Figures

PATENTED APR 22 1975  3,878,810
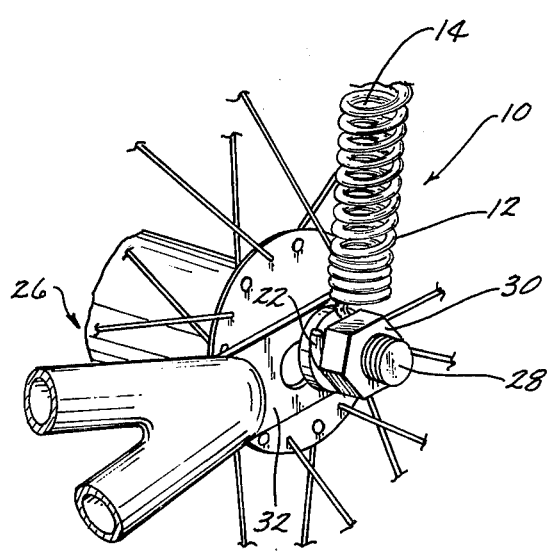
Fig. 3
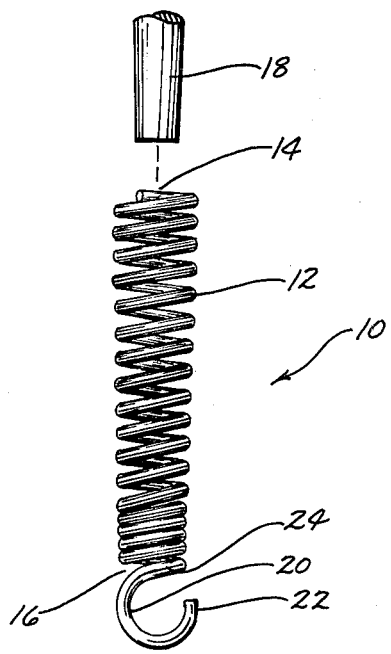
Fig. 1
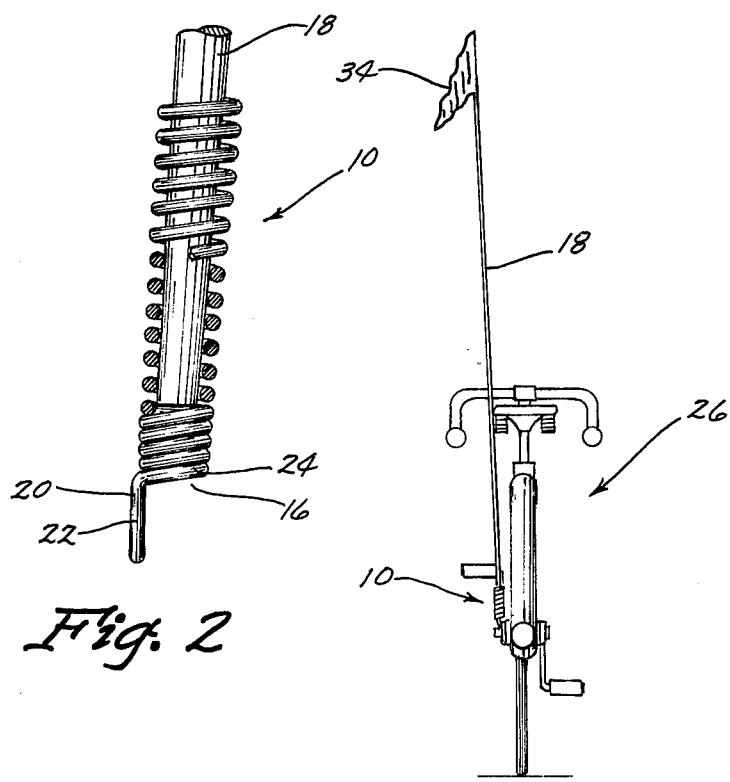
Fig. 2
Fig. 4

VEHICLE MOUNTED SAFETY WARNING DEVICE AND BRACKET THEREFOR

BACKGROUND OF THE INVENTION

The last several years have seen an ever-increasing trend in the popularity of manpowered vehicles such as bicycles, tricycles and the like. The continually ever-increasing number of such vehicles on the roads have, however, created certain safety hazards. This is so, because generally bicycles and other slow-moving vehicles operate at a rate of speed significantly less than the speed of automotive vehicles. This has resulted in a significant increase in the number of bicycle and automobile accidents. Accordingly, it is apparent that there is a real need for safety warning devices for approaching automobiles indicating that slow-moving vehicles such as bicycles are in the road. However, for any safety device to be successfully utilized by the public, it must be simple, inexpensive and economical to manufacture.

In addition, support brackets for vehicle safety flags must be capable of being securely fastened to the vehicle and of securely holding the safety flag. Otherwise, if the safety flag support bracket is not securely fastened to either the safety flag or the vehicle it will continually work loose during use of the vehicle and be more of a nuisance than an effective safety aid; therefore, if the bracket does not function properly, the user of the bicycle or other slow-moving vehicle is apt to remove the safety warning device entirely and proceed without such a device.

Accordingly, there is a real need for effective, easy to manufacture, vehicle safety flags and support brackets for those flags. This invention has as its object the satisfaction of that need.

In particular, it is an object of this invention to provide a safety flag support bracket which is easy to manufacture, and which has the capability of holding the safety flag securely so that it will not become loosened during usage.

Yet another object of this invention is to provide a support bracket for a vehicle safety flag which can be securely locked to the vehicle to insure that it will not be jarred loose during use of the vehicle.

Thus, the safety flag warning device, and bracket therefor, of this invention has the advantages of holding the safety flag securely and being capable of secure locking to the vehicle so that neither the bracket nor the safety flag will come loose during the normal jarring which occurs during usage of a bicycle or like vehicle.

The method of accomplishing these and other objects will become apparent from the following description of the invention.

BRIEF DESCRIPTION OF THE DRAWINGS

FIG. 1 is a perspective view of the spring support bracket of this invention;

FIG. 2 is another perspective view, with parts broken away, of the support bracket of FIG. 1 rotated 90° in counterclockwise fashion from the view of FIG. 1. FIG. 2 also shows the manner in which the support bracket securely holds the pole of a warning flag.

FIG. 3 is an exploded view showing one method of securing the fastening means end of the support bracket of this invention to a bicycle.

FIG. 4 is a rear perspective view of a bicycle showing a safety flag mounted in the safety flag bracket which in turn is mounted on a bicycle in the manner shown in FIG. 3.

DETAILED DESCRIPTION OF THE INVENTION

The safety flag support bracket of this invention comprises a spiraled spring member 12 having a flag support receiving end 14 and a fastening means end 16. The inside diameter of the spirals adjacent the fastening end means 16 is less than the inside diameter of the spiral adjacent the flag support receiving end 14. Preferably, the inside diameter of each spiral, progressing from the flag support receiving end to the fastening means end is smaller than the immediately preceding spiral. Most preferably, the spirals progressing from the receiving end 14 to the fastening end 16 are of gradually decreasing interior diameter.

Where the spirals are of gradually decreasing interior diameter as previously described, the safety flag support bracket has the ability to securely grasp the pole 18 of the safety flag. The pole 18 is of a proper diameter to easily fit within the interior of the flag support receiving end 14. The pole 18 once placed within the interior of flag support receiving end 14 is pushed downwardly to cause a compression effect on the spiraled spring member. The downward force actually compresses the spring member and actually causes a momentary increase in the interior diameter thereof. As a result the pole 18 is thrushed downwardly deeply into the interior of the spirals as most clearly shown in FIG. 2. However, once the downward force exerted on the pole 18 is removed, the spiraled spring 12 moves to its uncompressed state. The result is a decrease in the interior diameter of the formerly compressed spirals. As a result, once the compression is released, the interior diameter of the spring 12 narrows with the result being that the spring securely holds the pole 18 of the safety warning flag. Moreover, any upward pulling force on the pole 18 will actually result in spring member 12 grasping the pole 18 more tightly since the upward pulling force will cause a slight decrease in the interior diameter of the spirals. Of course, the gradually decreasing interior diameter of the spirals results in the spiraled spring member more securely holding the pole 18. The result is a flag-support bracket which securely holds the flag pole 18 and a support bracket which tends to more firmly grip pole 18 as forces are applied to remove the pole 18 therefrom. As a result there is little or no chance of pole 18 being jarred losse and being removed from the interior of spiral spring 12 during usage of the flag warning device.

Fastening means end 16 of spiraled spring 12 terminates in a fastening means 20 secured thereto.

Fastening means 20 can take a variety of structural forms. However, it is important that fastening means 20 be of a structure which will insure that support bracket 10 can be securely fastened to a bicycle or other slow-moving vehicle in a manner which will not have a tendency to jar loose during usage of the vehicle.

As shown in FIGS. 1 and 2 fastening means 20 comprise an open-hook fastening means extending downwardly from fastening means end 16 of spiraled spring 12. Of course, fastening means 20 could also be a closed hook means wherein the end 22 of fastening means 20 is extended in arcuate fashion into abutting relationship with portion 24 of fastening means 20. Also, it should be apparent that fastening means 20 can take other structural configurations which will allow fastening means 20 be placed around a shaft, axle or other device for appropriately securing the bracket to a vehicle.

As best seen in FIG. 2, fastening means 20 is slightly offset at an acute angle with respect to the longitudinal axis of spring member 12. The purpose of this is twofold. First, as most clearly depicted in FIG. 4, it insures that pole 18 will be slightly offset with respect to the perpendicular in order to generally incline pole 18 slightly outwardly and away from a vehicle such as bicycle 26. Thus, the safety flag and its support bracket will not interfere with normal operation of the bicycle or other vehicle. Secondly, slightly offsetting fastening means 20 with respect to the longitudinal axis of spiral spring 12 allows fastening means 20 to function as a lock washer. In this regard, it is preferred that portion 22 be itself slightly offset with respect to the longitudinal axis of portion 24 of fastening means 20.

Fastening means 20 is placed around shaft 28, which in the case of the bicycle depicted in FIG. 3, is an extension of the rear axle of the bicycle. Bolt 30 is threadably secured to shaft 28 with the result being that fastening means 20 is held securely between bolt 30 and frame member 32. However, since portion 22 is slightly offset with respect to portion 24 of fastening means 20, there is an outward pressure exerted by fastening means 20 counter to forces applied by threadably secured bolt 30. As a result, fastening means 30 functions as a lock washer to insure that bolt 30 will not become jarred loose during the normal jostlings that occur in usage of a bicycle or other like vehicle. Of course, fastening means 20 can take any configuration adapted to provide a lock washer effect. Of course, as viewed in FIG. 4, flag 34 is attached to pole 18 to provide the warning to approaching vehicles. Preferably, pole 18 extends high above bicycle 26 so that flag 34 can be seen from a distance by approaching vehicles.

Thus, as can be seen flag support bracket 10 accomplishes all of its stated objects. Flag support pole 18 is securely fastened thereto in a manner which insures that pole 18 will not easily be jarred loose. In fact, upward pulling forces on pole 18 result in spiraled spring 12 actually increasing its grip on pole 18. Fastening means 20 is adapted to provide a lock washer affect to insure that it will not become jarred loose during usage. Of course, the support bracket 10 has been shown as secured to rear axle 28 of bicycle 26 for representative purposes only. It could also be secured in like fashion to any other suitable position on a slow-moving vehicle.

What is claimed is:

1. A safety flag support bracket comprising, a spiraled spring member having a support receiving end, a fastening means end, the inside diameter of the spiral adjacent said fastening end being less than the inside diameter of the spiral adjacent said receiving end, and a fastening means secured to the fastening means end of said spring member said fastening means comprising a hook means slightly offset at an acute angle with respect to the longitudinal axis of said spring member, said hook means having a first side hook portion and a second side hook portion, said first side portion of said hook means being slightly offset with respect to the vertical axis of said second side portion of said hook means.

2. The bracket of claim 1 wherein the inside diameter of each spiral, progressing from the receiving end to the fastening end, is smaller than the inside diameter of the immediately preceding spiral.

3. The bracket of claim 1 wherein the spirals, progressing from the receiving end to the fastening end, are of gradually decreasing diameter.

4. In combination, the support bracket of claim 1, and a flag support pole securely received within said spiral.

5. The combination of claim 4 wherein said fastening means is secured to a vehicle.

* * * * *